(12) United States Patent
Hamamoto et al.

(10) Patent No.: US 9,346,117 B2
(45) Date of Patent: May 24, 2016

(54) METHOD OF MANUFACTURING AN INTEGRATED MEMBER

(71) Applicant: Kabushiki Kaisha F.C.C., Hamamatsu-shi, Shizuoka (JP)

(72) Inventors: Toshikazu Hamamoto, Hamamatsu (JP); Yasuyuki Doi, Hamamatsu (JP)

(73) Assignee: KABUSHIKI KAISHA F.C.C., Hamamatsu-shi (JP)

( * ) Notice: Subject to any disclaimer, the term of this patent is extended or adjusted under 35 U.S.C. 154(b) by 421 days.

(21) Appl. No.: 13/778,549

(22) Filed: Feb. 27, 2013

(65) Prior Publication Data

US 2014/0076083 A1   Mar. 20, 2014

Related U.S. Application Data

(63) Continuation of application No. PCT/JP2011/069312, filed on Aug. 26, 2011.

(30) Foreign Application Priority Data

Aug. 27, 2010   (JP) .................................. 2010-191018

(51) Int. Cl.
*B23K 11/16*   (2006.01)
*C21D 9/32*   (2006.01)
(Continued)

(52) U.S. Cl.
CPC ................. *B23K 11/16* (2013.01); *B23K 11/36* (2013.01); *C21D 1/06* (2013.01); *C21D 9/32* (2013.01);
(Continued)

(58) Field of Classification Search
CPC ...... B23K 11/16; B23K 11/36; B23K 11/002; B23K 11/02; B23K 11/20; B23K 2201/008; F16H 55/06; F02N 15/00; F02N 15/022; F02N 15/043; C23C 8/30; C23C 8/20; C23C 8/22; C23C 8/32; C21D 9/32; C21D 1/06; Y10T 29/49968; Y10T 74/1987; Y10T 428/211

See application file for complete search history.

(56) References Cited

U.S. PATENT DOCUMENTS

| | | | | |
|---|---|---|---|---|
| 2,583,868 | A | * | 1/1952 | Mociun .......................... 219/107 |
| 2007/0040458 | A1 | * | 2/2007 | Fujita et al. ..................... 310/62 |

FOREIGN PATENT DOCUMENTS

| | | |
|---|---|---|
| JP | 59-074275 | 4/1984 |
| JP | 05-052211 | 3/1993 |

(Continued)

OTHER PUBLICATIONS

English Machine Translation of JP2004285428 (A), Oct. 14, 2014.*

(Continued)

*Primary Examiner* — Sarang Afzali
(74) *Attorney, Agent, or Firm* — Knobbe Martens Olson and Bear LLP

(57) ABSTRACT

An integrated member can comprise different members each formed of materials having different mechanical characteristics. A method for manufacturing such an integrated member can comprise an electric resistance welding step in which the first member is press-fit into the second member and the press-fit portion can be electrically energized to achieve the electric resistance welding so as to integrate the first member and the second member. The method can further comprise a carburized layer forming step in which carburizing-quenching and tempering, or carbonitriding-quenching and tempering, is performed on the integrated member obtained in the electric resistance welding step to form carburized layers therein in accordance with the mechanical characteristics of the first member and the second member.

3 Claims, 5 Drawing Sheets

(51) Int. Cl.
*C21D 1/06* (2006.01)
*C23C 8/20* (2006.01)
*C23C 8/30* (2006.01)
*F02N 15/00* (2006.01)
*B23K 11/36* (2006.01)
*F16H 55/06* (2006.01)
*F02N 15/02* (2006.01)
*F02N 15/04* (2006.01)

(52) U.S. Cl.
CPC ... *C23C 8/20* (2013.01); *C23C 8/30* (2013.01); *F02N 15/00* (2013.01); *F16H 55/06* (2013.01); *B23K 2201/008* (2013.01); *F02N 15/022* (2013.01); *F02N 15/043* (2013.01); *Y10T 29/49968* (2015.01); *Y10T 74/1987* (2015.01)

(56) References Cited

FOREIGN PATENT DOCUMENTS

| | | |
|---|---|---|
| JP | 06-297143 | 10/1994 |
| JP | 2004-285428 | 10/2004 |
| JP | 2010-071372 | 4/2010 |
| WO | WO 2006/033316 | 3/2006 |

OTHER PUBLICATIONS

International Search Report for International App. No. PCT/JP2011/069312, 4 pages, dated Dec. 6, 2011.

\* cited by examiner

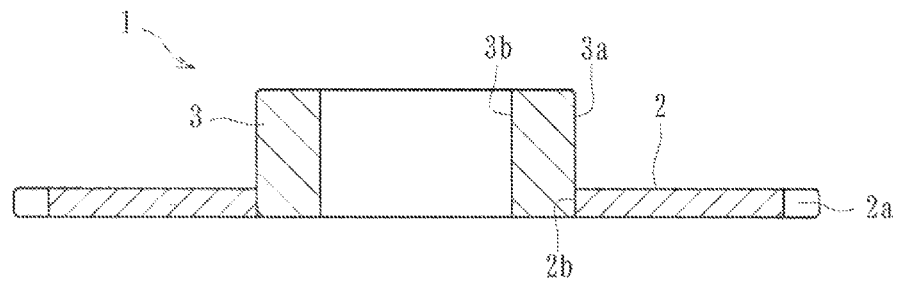
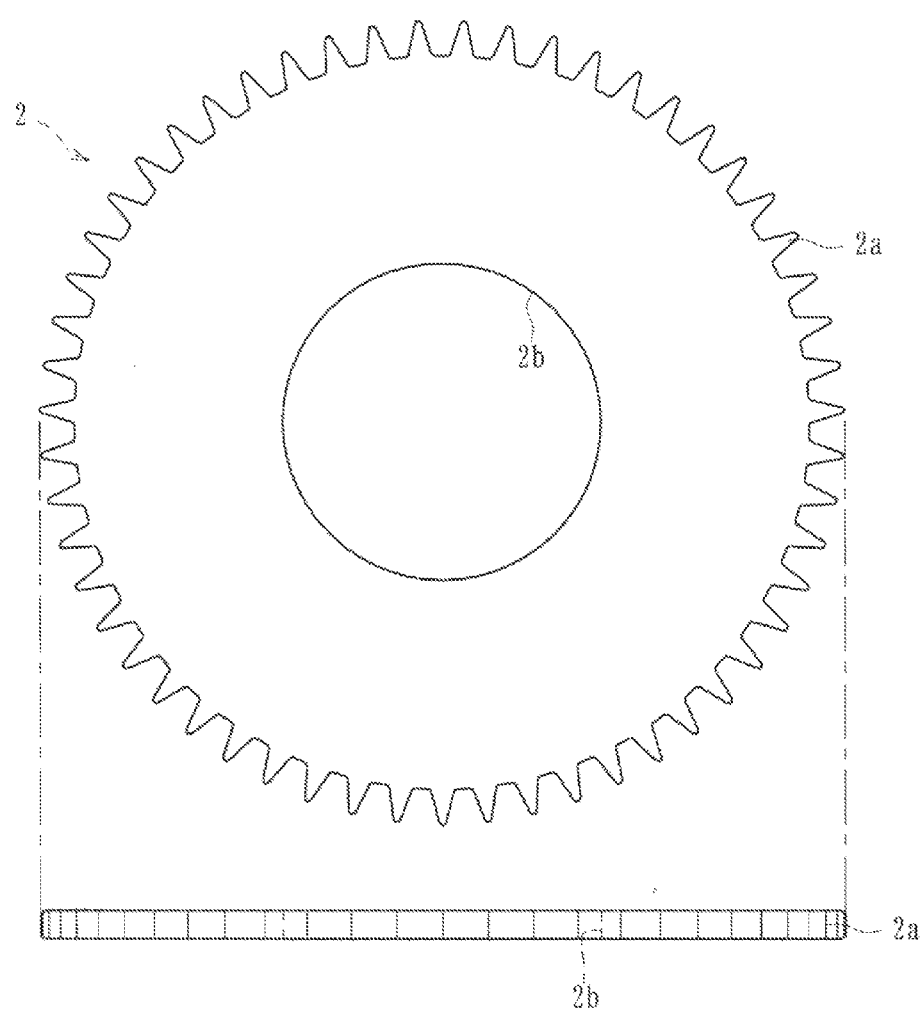

METHOD OF MANUFACTURING AN INTEGRATED MEMBER

INCORPORATION BY REFERENCE TO ANY PRIORITY APPLICATIONS

Any and all applications for which a foreign or domestic priority claim is identified in the Application Data Sheet as filed with the present application, are hereby incorporated by reference under 37 CFR 1.57.

BACKGROUND

1. Field

The present disclosure relates to an integrated member integrally formed by welding together a first member and a second member wherein the first and second members have different mechanical characteristics, and a method for manufacturing the integrated member.

2. Description of the Related Art

A starter-driven gear for transmitting a driving force of a starter motor of a vehicle to a crankshaft of an engine can be manufactured by integrating a shaft component made of alloy steel and a gear component made of carbon or alloy steel. The gear component can have an annular configuration and be formed with teeth on its outer circumference via electron beam welding. In some cases, since the shaft component is to be mounted on a vehicle via bearings fitted on the outer and inner circumferences of the shaft component, it is desired that the shaft component has high hardness. On the other hand, it may be sufficient that the gear component has sufficient strength to withstand meshing with a mating gear, and thus the shaft component would not be required to have as much hardness, but instead be required to suppress its hardness to a moderate degree in order to prevent breakage of gear teeth.

One manufacturing method has been proposed, for example, in Japanese Application No. 285428/2004, as a technology for welding two members together, each member having different mechanical characteristics. That is, a shaft component, prior to welding, can be formed with a carburized layer (e.g. a preparatory carburized layer) by performing carburizing-quenching and tempering. The shaft component and the preparatory carburized layer of the shaft component to be welded to a gear component can be removed by cutting, or other removal procedures. Then, the gear component can be press-fit to the portion of the shaft component from which the preparatory carburized layer is removed, where the shaft component and the gear component can be integrally welded to each other to form an integrated member. The obtained integrated member can be further treated by carburizing-quenching and tempering, or carbonitriding-quenching and tempering, to form a starter-driven gear having desired mechanical characteristics (i.e. the shaft component having deeper carburized layer and higher hardness than those of the gear component).

SUMMARY

An aspect of at least one of the inventions disclosed herein includes the realization that the method for manufacturing an integrated member of the prior art described above includes unnecessary steps. For example, in the above-described prior art method, it is necessary to form the preparatory carburized layer before welding the shaft component and the gear component (preparatory carburized layer forming step) and further necessary to remove the preparatory carburized layer of the shaft component to be welded to a gear component (removing step of the preparatory carburized layer). The method described above includes the unnecessary manufacturing steps of the preparatory carburized layer forming step and the removal of the preparatory carburized layer, thus leading to an increase in the manufacturing cost.

Furthermore, cracks, or other deformities, may be formed in the welded portion, and thus the yield of production could also be detracted. Cracks may occur because, for example, during melt-welding (welding method performed by melting a base metal), such as electron beam welding, the welded members may be heated to extremely high temperature and then cooled in a short time. This quenching can lead to cracks in cases using high carbon content.

It is therefore an object of the present disclosure to provide an integrated member comprising different members, each having different mechanical characteristics, and a method for manufacturing the integrated member which can reduce the manufacturing steps, and thus the manufacturing cost, as well as suppress generation of cracks, or other deformities, during any welding steps, and thus improve the yield of production.

In some embodiments, a method for manufacturing an integrated member can comprise welding a first member and a second member having different mechanical characteristics to each other, characterized in that the first member can be made of material having higher carbon content than that of the second member. The method can comprise an electric resistance welding step in which the first member can be press-fit into the second member, where the press-fit portion can be electrically energized to achieve electric resistance welding so as to integrate the first member and the second member. Additionally, the method can also include a carburized layer forming step in which carburizing-quenching and tempering, or carbonitriding-quenching and tempering, can be performed on the integrated member obtained in the electric resistance welding step to form carburized layers, therein in accordance with the mechanical characteristics of the first member and the second member.

In some embodiments, a method for manufacturing an integrated member can be performed on a first member which can comprise a shaft component and a second member which can comprise an annular component formed with a central opening into which the shaft component can be press-fit. The method can include annular electric resistance welding performed with the shaft component being press-fit into the opening by electrically energizing the press-fit portion between the shaft component and the opening edge of the annular component.

Some embodiments are directed to a method for manufacturing an integrated member which can comprise a starter-driven gear for transmitting the driving force of a starter motor of a vehicle to a crankshaft of an engine. An annular component can have teeth formed on its outer circumference, thereby forming a gear component of the starter-driven gear. The gear component can be adapted to be mounted on the vehicle via bearings fitted on the outer circumference and inner circumference of the shaft component.

In some embodiments, an integrated member can be integrally formed by welding a first member and a second member having different mechanical characteristics to each other, characterized in that the first member can be made of material having higher carbon content than that of the second member. The integrated member can be made via an electric resistance welding step, in which the first member can be press-fit into the second member, and the press-fit portion can be electrically energized to achieve electric resistance welding so as to integrate the first member and the second member. Additionally, a carburized layer forming step in which carburizing-quenching and tempering, or carbonitriding-quenching and tempering, can be performed on the integrated member obtained in the electric resistance welding step to form carburized layers therein in accordance with the mechanical characteristics of the first member and the second member.

In some embodiments, an integrated member can comprise a first member which can comprise a shaft component and a second member can comprise an annular component formed with a central opening into which the shaft component can be press-fitted. Annular electric resistance welding can be performed with the shaft component being press-fit into the opening by electrically energizing the press-fit portion between the shaft component and the opening edge of the annular component.

In some embodiments, an integrated member can comprise a starter-driven gear for transmitting the driving force of a starter motor of a vehicle to a crankshaft of an engine, and an annular component can be formed with teeth on its outer circumference to form a gear component of the starter-driven gear. The annular component can be adapted to be mounted on the vehicle via bearings fitted on the outer circumference and inner circumference of the shaft component.

In embodiments where the first member is made of material having higher carbon content than that of the second member, and the first and second members are formed with carburized layers different from each other in the carburized layer forming step, after the first and second members have been integrated in the electric resistance welding step, it is possible to reduce the manufacturing steps, and thus the manufacturing cost, and to suppress generation of cracks, or other deformities, during a welding step, and thus to improve the yield of production.

BRIEF DESCRIPTION OF THE DRAWINGS

FIG. 3 illustrates a cross-sectional side elevation view taken along a line III-III in FIG. 1.

FIG. 4 illustrates a plan view and a side elevation view showing an annular component (gear component) of an embodiment of a starter-driven gear.

DETAILED DESCRIPTION

Several embodiments of the present disclosure are described below with reference to accompanied drawings.

An integrated member 1 of an embodiment of the present disclosure can be a starter-driven gear comprising a shaft component 3 as a first member and an annular component (gear component) 2 as a second member, as shown in FIGS. 1-5. The first and second components 3 and 2 can have different mechanical characteristics (e.g. wear resistance, strength, toughness, etc.) and can be integrated to each other by, for example, welding.

Figure 1:
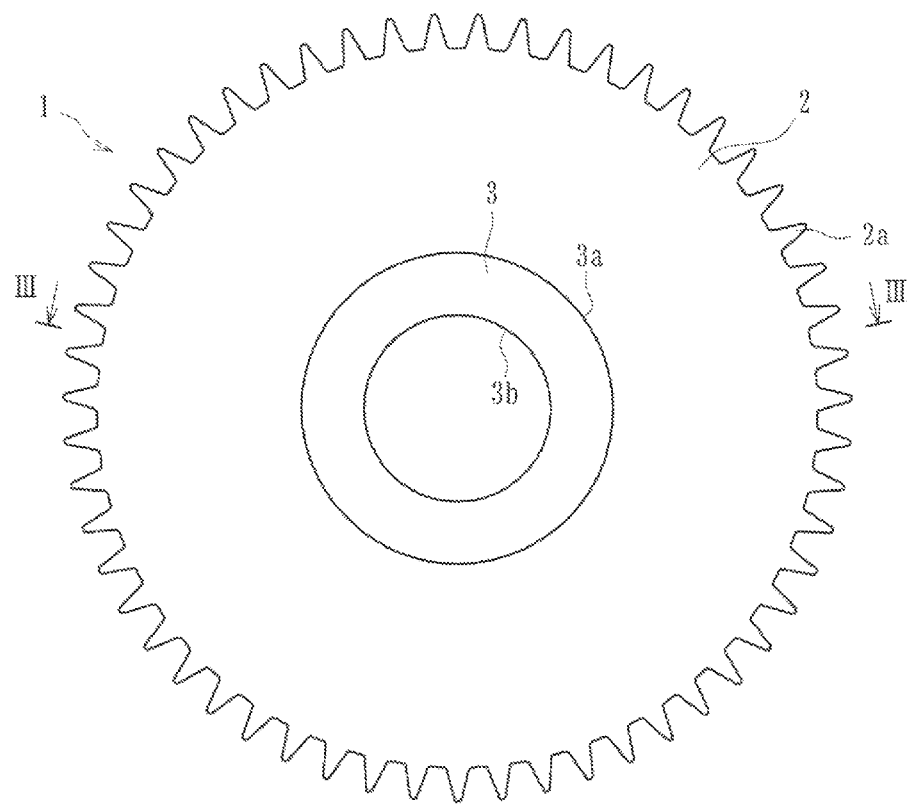
FIG. 1 illustrates a plan view showing a starter-driven gear as an integrated member according to an embodiment of the present disclosure.
Figure 2:
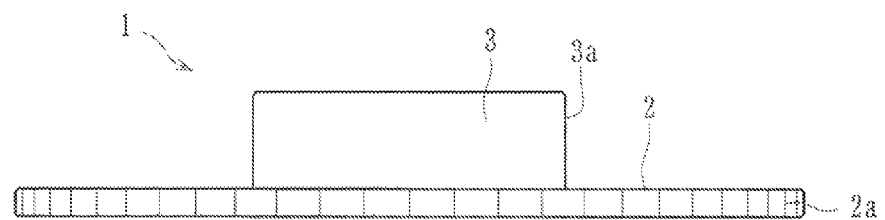
FIG. 2 illustrates a side elevation view of the starter-driven gear of FIG. 1.
Figure 5:
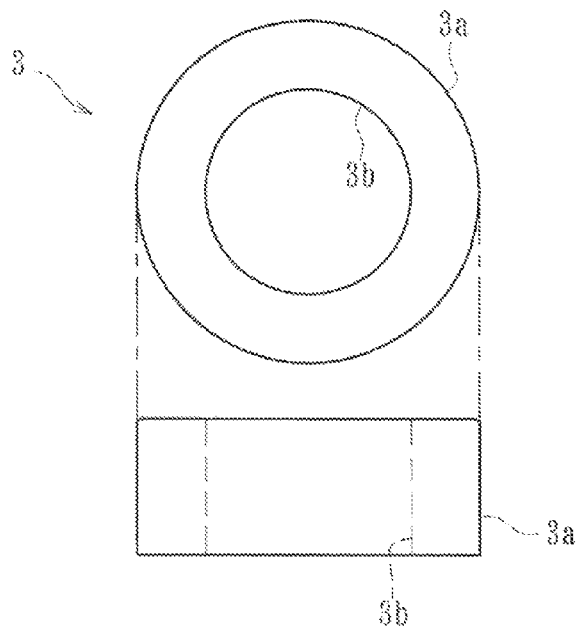
FIG. 5 illustrates a plan view and a side elevation view showing a shaft component of an embodiment of a starter-driven gear.
Figure 9:
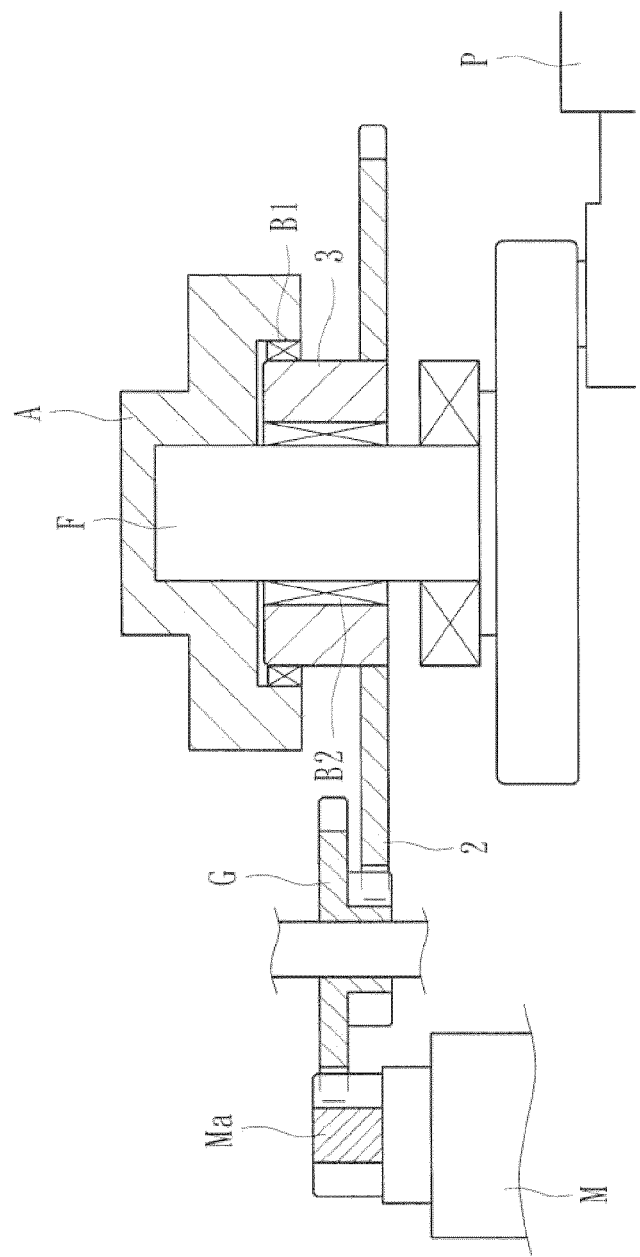
FIG. 9 illustrates a schematic view showing an embodiment of a starter-driven gear mounted on a vehicle.

The shaft component (first member) 3 can be formed of a hollow cylindrical metallic member comprising, for example, alloy steel, and having an outer circumferential surface 3a and an inner circumferential surface 3b, as shown in FIG. 5. The shaft component 3 can be adapted to be mounted on a vehicle such as, for example, an automobile, via bearings (e.g. a one-way bearing B1 and a radial bearing B2) mounted on the outer and inner circumferences 3a and 3b, as shown FIG. 9.

The annular component (second member) 2 can be formed of an annular metallic member, such as carbon steel or alloy steel, having a central opening 2b into which the shaft component 3 can be press-fit, as shown in FIG. 4. That is, an inner diameter of the opening 2b can be formed slightly smaller than an outer diameter (diameter of the outer circumference 3a) of the shaft component 3. Thus, the shaft component 3 can be press-fit into the annular component 2 by axially pushing the shaft component 3 against the annular component 2 with the shaft component 3 in contact with the circumferential edge of the opening 2b.

The annular component 2 can be formed with teeth 2a on its periphery to form a gear component of starter-driven gear 1. That is, with reference also to FIG. 9, the annular component 2 of the starter-driven gear 1 can form a gear for transmitting the driving force of a starter motor M of a vehicle such as, for example, an automobile or a motorcycle, so that the teeth 2a of the annular component (gear component) 2 can mate with teeth of a gear G when the annular component 2 is assembled with a vehicle. Thus, when the starter motor M is powered, its output shaft Ma can be rotated and the driving force can be transmitted to the annular component 2 of the starter-driven gear 1 via gear G.

In some embodiments, the one-way bearing B1 can be mounted between the outer circumference 3a of the shaft component 3 of the starter-driven gear 1 and an outer casing A, and the radial bearing B2 can be mounted between the inner circumference 3b of the shaft component 3 and crankshaft F. Accordingly, when the starter-driven gear 1 is rotated by the driving force of the starter motor M, the driving force can be transmitted to the crankshaft F via the one-way bearing B1 and the outer A, and thus the piston P can be driven.

Figure 6:
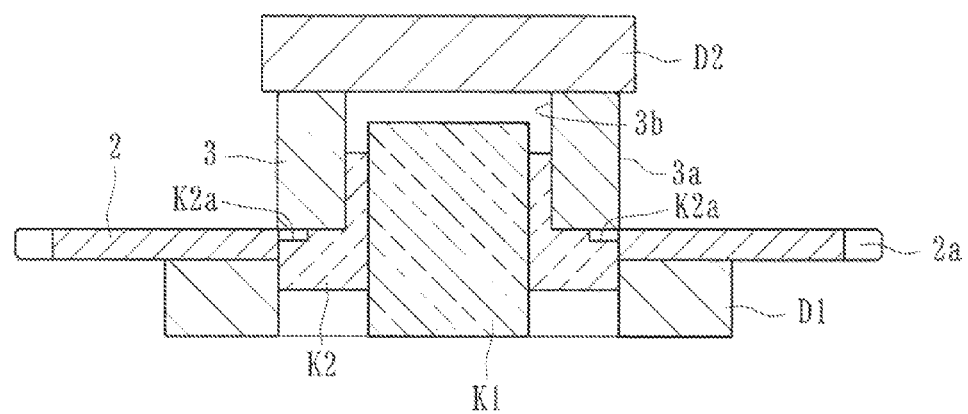
FIG. 6 illustrates a schematic view showing an electric resistance welding apparatus for manufacturing an embodiment of a starter-driven gear before press-fitting.
Figure 7:
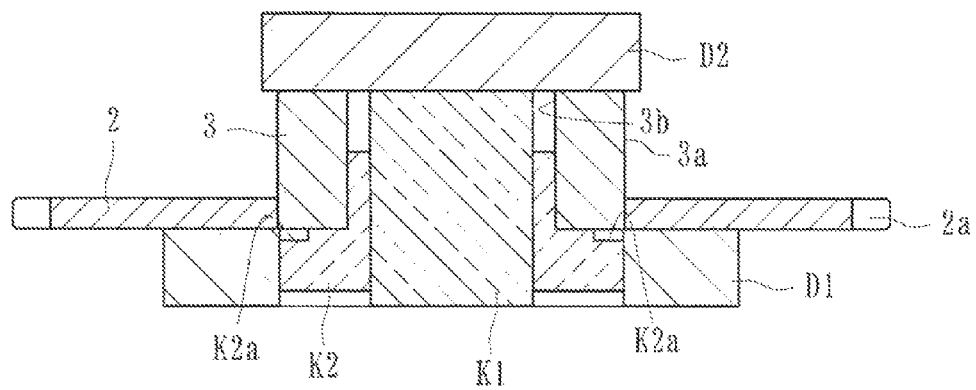
FIG. 7 illustrates a schematic view showing an electric resistance welding apparatus for manufacturing an embodiment of a starter-driven gear (after press-fitting).

According to an embodiment of the present disclosure, the shaft component (i.e. first member) 3 can be made of material having a higher carbon content than that of the annular component (i.e. second member) 2. For example, the shaft component 3 can be made of, for example, medium or high carbon alloy steel and the annular component 2 can be made of, for example, low carbon steel or low carbon alloy steel. The starter-driven gear 1 can be integrally formed with the shaft component 3 and the annular component 2 can be manufactured through the manufacturing steps described below An electric resistance welding step can be carried out by using an annular electric resistance welding apparatus, as shown in FIGS. 6 and 7. The annular electric resistance welding apparatus can generally comprise a lower electrode die D1 on which the annular component 2 can be placed, an upper electrode die D2 able to be in contact with the top end of the shaft component 3, and first and second jigs K1, K2.

The lower electrode die D1, upper electrode die D2 and first jig K1 can be made of a good conductive material, such as chromium or copper, and the second jig K2 can be made of a non-magnetic insulating material. Other materials can also be used. As shown in FIG. 6, it is possible to arrange both the shaft component 3 and the annular component 2 within the annular electric resistance welding apparatus while placing the annular component 2 on the lower electrode die D1 and holding the shaft component 3 on the second jig K2.

The electric resistance welding step can be performed by lowering the upper electrode die D2 in order to press-fit the shaft component (first member) 3 into the annular component (second member) 2, while simultaneously electrically energizing the press-fit portion. Thus, annular electric resistance welding can be achieved by melting an interface between the outer circumferential surface 3a of the shaft component 3 and the opening 2b of the annular component 2b by press-fitting the shaft component 3 into the annular component 2 and electrically energizing the components. Then, as shown in FIG. 7, the lowering motion of the upper electrode die D2 can be stopped when it abuts against the first jig K1, after which the press-fitting operation and the electrically energizing operation are completed. Thereafter, an integrated member 1 comprising the shaft component 3 and the annular component can be formed.

According to an embodiment of the electric resistance welding step of the present disclosure, positioning of the welding of the shaft component 3 relative to the annular component 2 can be achieved by the abutment of the upper electrode die D2 against the first jig K1 during the lowering motion of the upper electrode die D2, followed by the press-fitting and electrical resistance welding operations. Thus, it is possible to achieve welding of high accuracy without the need to position the welding, e.g. by forming a stepped portion on either one of the object components (the shaft component 3 or the annular component 2). A groove K2a can be formed on the second jig K2 that can enable the pads generated during the press-fitting operation to enter therein.

In addition, according to an embodiment of the electric resistance welding step of the present disclosure, it is possible to achieve excellent welding between the shaft component 3 and the annular component 2 in a short time, and to improve the manufacturing cycle time and assembling accuracy as compared with electron beam welding, plasma welding using a welding torch, or TIG welding. That is, according to the annular electric resistance welding of the present disclosure, it is possible to perform the welding of the shaft component 3 and the annular component 2 with a small amount of heat input, thereby suppressing distortion of the components.

In some embodiments, the carburized layer forming step is a step in which carburizing-quenching and tempering, or carbonitriding-quenching and tempering, can be performed on the integrated member 1 obtained in the electric resistance welding step to form carburized layers therein in accordance with the mechanical characteristics of the shaft component (first member) 3 and the annular component (second member) 2. That is, according to the present disclosure, since the shaft component (first member) 3 can be made of a material having higher carbon content than that of the annular component (second member) 2, a deeper carburized layer can be formed in the shaft component 3 and, on the other hand, a shallower carburized layer can be formed in the annular component 2.

Since the annular component (second member) 2 forming the starter-driven gear 1 can be a component mating with another gear, the annular component may not have high hardness, and it can be useful to suppress its hardness to a moderate degree to prevent breakage of gear teeth. However, it is preferable to have a shallower carburized layer as obtained in the present disclosure. On the other hand, since the shaft component (first member) 3 forming the starter-driven gear 1 can be a component adapted to be mounted, e.g. on a vehicle via bearings (e.g. a one-way bearing B1 and a radial bearing B2) and on the outer and inner circumferences 3a, 3b, it may have high hardness and wear resistance. Accordingly, it is preferable that a deeper carburized layer is formed in the shaft component 3. According to the present disclosure, it is possible to manufacture the integrated member (starter-driven gear) 1 integrally formed by welding a first member (shaft component) 3 and a second member (annular component) 2 having different mechanical characteristics from each other.

Figure 8:
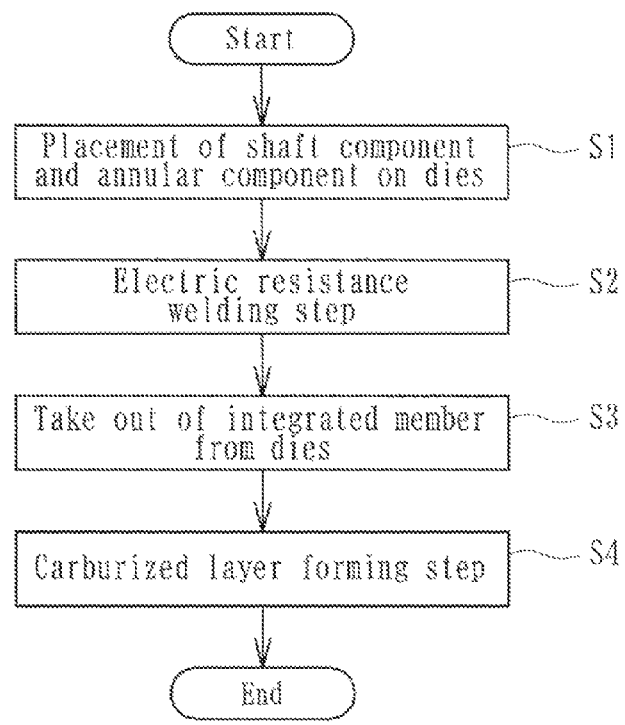
FIG. 8 illustrates a flowchart showing manufacturing steps of an embodiment of a starter-driven gear.

The steps for manufacturing the integrated member (starter-driven gear) of the present disclosure will be described below with reference to a flowchart of FIG. 8.

The annular component 2 and the shaft component 3 can be manufactured by general machining processes. As previously described, the shaft component (first member) 3 can be made of material having a higher carbon content than that of the annular component (second member) 2. For example, the shaft component 3 can be made of medium carbon alloy steel (or high carbon alloy steel) and the annular component 2 can be made of low carbon steel or low carbon alloy steel.

The shaft component 3 and the annular component 2 can be placed respectively on the upper electrode die D2 and the lower electrode die D1, as shown in FIG. 6 (S1). Then, the electric resistance welding step (S2) can be performed by lowering the upper electrode die D2 while simultaneously electrically energizing the upper and lower electrode dies D2, D1. Then, the integrated member 1 formed in the electric resistance welding step S2 can be taken out from the lower and upper electrode dies D1, D2 (S3). Finally, the carburized layer forming step (S4) can be performed on the integrated member 1. After having performed the steps S1-S4, it is possible to obtain a starter-driven gear (integrated member) 1 comprising the shaft component 3 having a deep carburized layer and the annular component 2 having a shallow carburized layer.

According to the present disclosure, since the shaft component (first member) 3 can be made of material having higher carbon content than that of the annular component (second member) 2, and different carburized layers can be formed in these components 2, 3 in the carburized layer forming step S4 after having integrated these components 2, 3 in the electric resistance welding step S2, it is possible to reduce the manufacturing steps, and thus the manufacturing cost as well as to suppress generation of cracks, or other deformities, during the welding step, thus improving the yield of production.

The present disclosure has been described with reference to the preferred embodiments. Obviously, modifications and alternatives will occur to those of ordinary skill in the art upon reading and understanding the preceding detailed description. It is intended that the present disclosure be construed as including all such alternatives and modifications insofar as they come within the scope of the appended claims or the equivalents thereof. For example, the present disclosure may be applied to integrated members and methods for manufacturing them different from a starter-driven gear if the integrated members and their manufacturing methods are those for first members and second members having different mechanical characteristics from each other. That is, the first and second members may be those having other configurations and characteristics than the first and second members described with reference to the preferred embodiments.

The present disclosure can be applied to those having different configuration or additional function insofar as they are integrated members and manufactured by a method for manufacturing an integrated member integrally formed by welding a first member and a second member having different mechanical characteristics from each other, characterized in that the first member can be made of material having higher carbon content than that of the second member. Additionally, the method can comprise an electric resistance welding step in which the first member can be press-fit into the second member, and the press-fit portion can be electrically energized to achieve electric resistance welding so as to integrate the first member and the second member. Further, a carburized layer forming step in which carburizing-quenching and tempering, or carbonitriding-quenching and tempering, can be performed on the integrated member obtained in the electric resistance welding step to form carburized layers therein in accordance with the mechanical characteristics for the first member and the second member.

What is claimed is:

1. A method for manufacturing an integrated member (1) integrally formed by welding a first member (3) and a second member (2) having different mechanical characteristics from each other characterized in:
that the first member (3) is made of material having higher carbon content than that of the second member (2);
that the method comprises:
press-fitting the first member into the second member forming a press-fit portion;
electrically energizing the press-fit portion during the press-fitting so as to electrically resist weld the first member to the second member so as to integrate the first member with the second member and so as to form an integrated member; and
carburizing-quenching and tempering, or carbonitriding-quenching and tempering, the integrated member so as to form carburized layers therein;
wherein the first member (3) comprises a shaft component and the second member (2) comprises an annular component formed with a central opening (2b) into which the shaft component (3) can be press-fit; and
wherein an annular electric resistance welding is performed during the press-fitting with the shaft component (3) being press-fit into the opening (2b) and electrically energizing the press-fitted portion between the shaft component (3) and the opening edge of the annular component (2).

2. A method for manufacturing an integrated member (1) of claim 1 wherein the integrated member (1) comprises a starter-driven gear for transmitting the driving force of a starter motor (M) of a vehicle to a crankshaft of an engine, and wherein the annular component (2) has teeth (2a) formed on its outer circumference and forms a gear component of the starter-driven gear (1) and is adapted to be mounted on the vehicle via bearings (B1, B2) fitted on the outer circumference (3a) and inner circumference (3b) of the shaft component (3).

3. A method for manufacturing an integrated member (1) of claim 1, wherein the carburizing-quenching and tempering, or the carbonitriding-quenching and tempering, is performed in accordance with the mechanical characteristics of the first member (3) and the second member (2).

* * * * *